W. H. SOUTHER.
AIR BRAKE SYSTEM.
APPLICATION FILED MAY 12, 1921.

1,418,210.

Patented May 30, 1922.
2 SHEETS—SHEET 1.

Inventor
William H. Souther

W. H. SOUTHER.
AIR BRAKE SYSTEM.
APPLICATION FILED MAY 12, 1921.

1,418,210.

Patented May 30, 1922.
2 SHEETS—SHEET 2.

Inventor,
William H. Souther
by
Greenwood
atty

UNITED STATES PATENT OFFICE.

WILLIAM HENRY SOUTHER, OF WEST ST. JOHN, NEW BRUNSWICK, CANADA.

AIR-BRAKE SYSTEM.

1,418,210.  Specification of Letters Patent.  Patented May 30, 1922.

Application filed May 12, 1921. Serial No. 469,070.

*To all whom it may concern:*

Be it known that I, WILLIAM HENRY SOUTHER, a subject of the King of Great Britain, residing at West St. John, in the Province of New Brunswick, Canada, have invented an Improvement in Air-Brake Systems, of which the following is a specification.

This invention relates to air brake systems and especially to the type of air brakes usually employed on freight cars.

The type of air brake system with which a railroad freight car is equipped usually has no means for compensating for wear of the brake shoes. Due to the power-increasing linkages connecting the brake shoes with the piston of the air brake, the wear is magnified at the piston and the piston travel must increase as wear continues to exert the same braking effect. It is found that when the piston travels from—say—six to eight inches to set the brakes, the most efficient braking results are obtained and when the piston travel is greater, the braking effect is reduced and for a piston travel of—say— ten or eleven inches the braking effect is practically nothing.

It is customary periodically to measure the piston travel whereby to determine the effectiveness of the brakes and make such adjustments as may be found necessary. For this purpose the train is run into an inspecting station and the brakes of all the cars of the train are set. An inspector then travels along the train to observe the piston travel of the brakes of the cars of the train. If the train is at all long, air will leak out of the brake cylinders of the rear cars and release the brakes before the inspector has had time to reach them and consequently the inspector has no means of determining the piston travel and, consequently, the condition of the released brakes of the cars.

The object of this invention is to provide an air brake system with means automatically to indicate the braking efficiency of the system and, specifically, to provide the air brake with means arranged automatically to indicate the travel of the piston.

Apparatus embodying the invention may include a member slidably supported by a stationary member and adapted to be engaged by the piston of the air brake and moved along said stationary member, and manually-controlled means arranged releasingly to retain said slidable member in its extreme moved position on said stationary member whereby to indicate, from its position on said member, the extent of piston travel and, consequently, the braking efficiency of the system.

A further object is generally to improve the construction and operation of air brake systems.

As here shown, my invention is applied to the air brake system including the air brake cylinder 10 having the extension 11 and the piston rod 12 extended beyond the extension 11 and movable outwardly and inwardly to set and release the brakes. Said rod may be connected with a lever 13 of the brake system which in turn may be connected with other linkages to the brake shoes.

Figure 1:
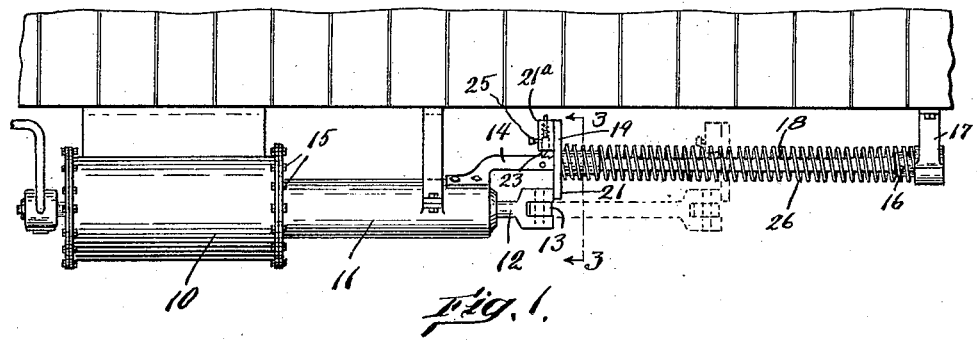
Fig. 1 is a side elevation of an air brake cylinder with my invention applied thereto.
Figure 2:
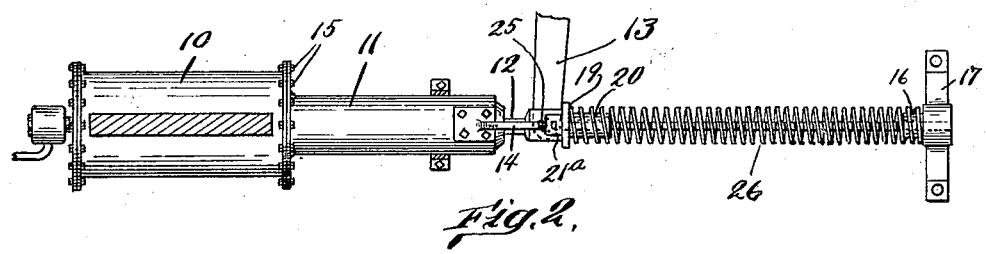
Fig. 2 is a plan view of the air brake cylinder and associated mechanism of Fig. 1.
Figure 3:
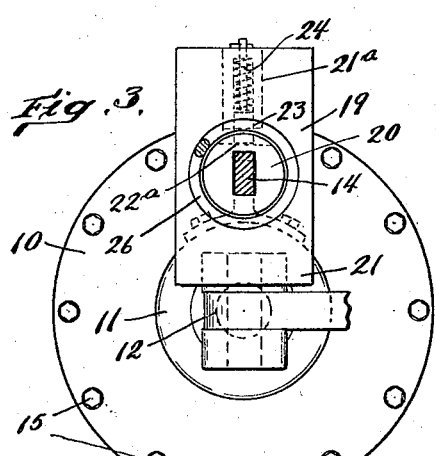
Fig. 3 is a section along lines 3—3 of Fig. 1.
Figure 4:
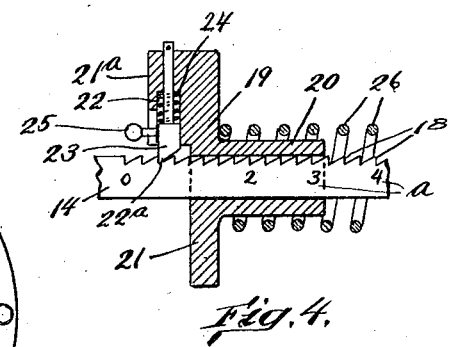
Fig. 4 is a sectional detail of the slider.

As illustrated in Fig. 1, my invention includes the guide comprising the rectangular, edgewise-arranged bar 14 secured to the air brake cylinder or the extension 11 thereof by suitable means, as the bolts 15, and extended outwardly therefrom above and parallel to the path of travel of the piston rod. The outer end of said bar is received and secured in the cylindrical boss 16 of the hanger 17 adapted to be secured to the frame of the car. Said bar 14 is formed with a series of teeth 18 in its upper edge adapted to be engaged by the latch of a slider 19 whereby to hold the slider in moved positions on said rod.

The slider 19 is formed with the cylindrical hub 20 which has a rectangular slot therethrough in which said guide bar 14 is received. A flange 21 is formed on the inner end of said hub and said flange is extended downwardly below said bar 14 into the path of travel of the piston rod, and forms an abutment adapted to be engaged by the piston rod on its outward stroke to move the slider along said bar 14. Said flange also extends upwardly above said bar and is formed with an extension 21ª. Said extension is formed with an aperture 22 therein vertically disposed above said bar and a latch 23 is received therein and is pressed releasingly in engagement with the teeth 18 of said bar by the spring 24. A knob 25 is secured to said latch and extends beyond said extension to provide means to raise the latch manually for resetting the slider. The teeth engaging portion 22ª of said latch and the teeth 18 of said bar 14 are so arranged that, while the slider may be moved outwardly by the piston rod, the slider will remain set in its extreme moved position until the latch is raised. A compression spring 26 is extended between said slider and the hanger 17 and encircles the hub 20 of said slider and the boss 16 of said hanger and is arranged yieldingly to restrain the slider in any moved position on said bar and return it to its extreme inward position against the end of the piston rod when the latch 23 is raised. Said spring functions to maintain the slider in contact with the end of the piston rod when the piston is moved outwardly and prevents the slider from moving outwardly further than the actual piston travel, as might otherwise be the case, by reason of its momentum, when the air brake is applied suddenly, and the piston is moved out rapidly.

If desired, said bar 14 may be provided with a series of indicia $a$, as inch graduations, whereby to measure and indicate the stroke of the piston.

It is obvious that, if the slider is moved inwardly to engage the end of the piston rod when the brakes are released and the piston is consequently retracted, when the brakes are set the slider will be moved along the guide by the piston rod in its outward movement and will register the extent of piston travel; and said slider will remain locked in moved position until released. It is not necessary to reset the slider each time the brakes are inspected as the extent of travel of the piston rod tends always to increase, after each adjustment, and as the travel increases the slider will be moved outward to indicate the increase so that the extent of piston travel and consequently the efficiency of the brake of any car of a train may be known at any time by an inspection of the position of the slider on its guide.

The arrangement of the slider 19 with the latch 23, and the guide bar 14 with its teeth 18 is such that, while the slider may be moved freely outward on the bar, it is held positively from moving inwardly accidentally and consequently the apparatus will not give a more favorable reading than the condition of the air brake warrants.

Figure 7:
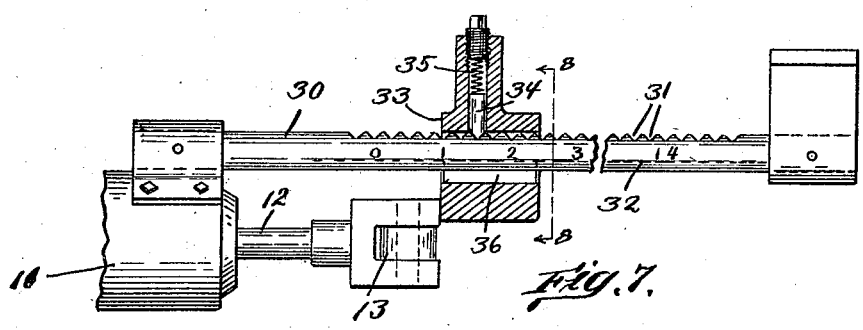
Fig. 7 is a side elevation, partly in section, of a modified form of my invention.

In the modification illustrated in Fig. 7, the guide comprises the cylindrical rod 30 having the V-shaped notches 31 in its upper side and the key-way 32 in its lower side. The slider 33 has the latch 34 which is forced into yielding engagement with the notches 31 by the spring 35; and the key 36 which is slidable in the key-way 32 to maintain the slider in vertical position. The tension of said spring 35 is arranged to be sufficient to maintain the slider in set position on its guide against displacement due to vibration and yet permit its movement along the guide by the piston rod and also manually.

Figures 8, 9:
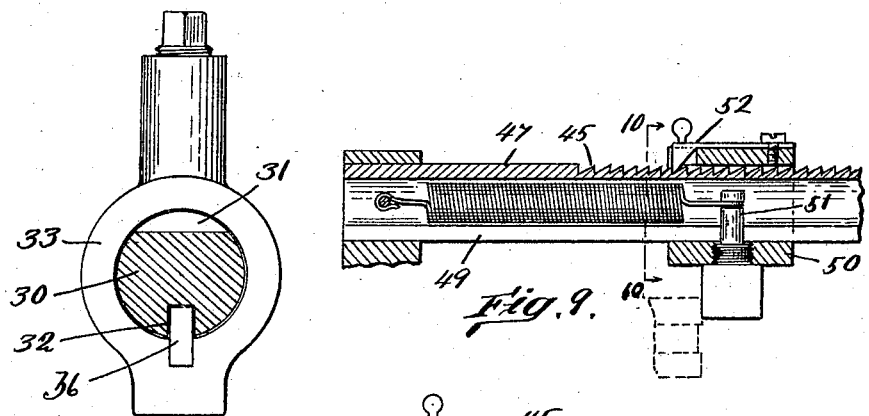
Fig. 8 is a section along line 8—8 of Fig. 7.
Fig. 9 is a sectional detail of a further modified form of my invention.
Figure 10:
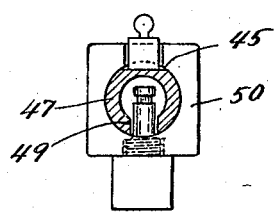
Fig. 10 is a section along line 10—10 of Fig. 9.

In the modification illustrated in Fig. 9, the guide comprises the tube 47 formed with the notches 45 in its upper side and a slot 49 in its lower side. The slider 50 has a pin 51 which extends within the slot 49 to prevent rotation of the slider and a tensile spring is contained within the tube and connected with said pin and arranged to move the slide inwardly toward the air brake cylinder. A spring latch 52 is arranged to engage the notches 45 of the guide whereby to hold the slider in set position.

Figure 11:
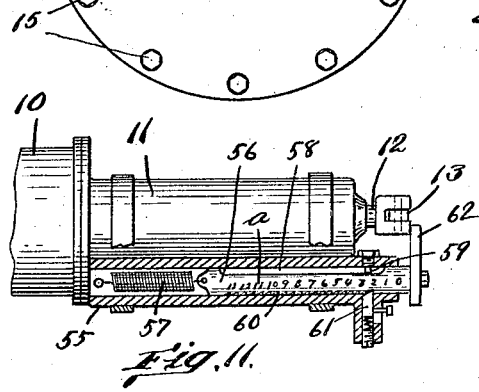
Fig. 11 is a sectional detail of a further modified form of my invention.
Figure 5:
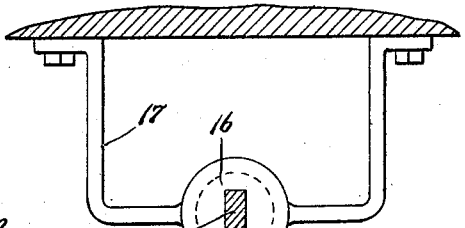
Fig. 5 is an end view of the hanger for supporting the end of the slider guide.
Figure 6:
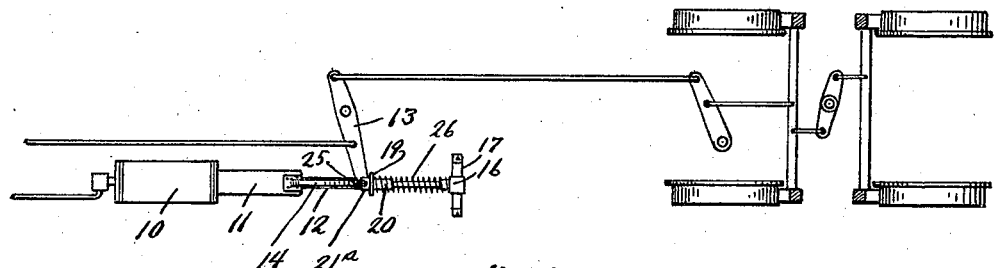
Fig. 6 is a diagrammatic view of an air brake system with my invention applied thereto.

In the modification illustrated in Fig. 11 the guide comprises the tube 55 secured directly to the extension 11 of the air brake cylinder. The slider comprises the cylindrical rod 56 received within said tube and secured to the tensile spring 57 disposed within the tube and which tends to draw the slider inwardly. A key-way 58 is formed in the top part of said rod 56 and a pin 59 is extended therein to prevent rotation of said rod; and a series of notches 60 are formed in the lower part of said rod adapted to be engaged by a spring-pressed latch 61 carried by said guide 55. A plate 62 is secured on the end of said rod and is adapted to be engaged by the piston rod.

While the invention is here applied to register directly the travel of the piston of the air brake cylinder yet it is obvious that it may be applied to another movable part of the brake system for a car to register the braking efficiency of the system; and it is also obvious that the invention may be otherwise modified without departing from the spirit thereof.

I claim:

1. A device for registering the travel of the piston of an air brake comprising a stationary guide bar of substantial length, a slider movably supported thereby arranged to be engaged by the piston and moved outwardly along said guide bar, manually-operable means arranged releasingly to hold said slider in moved positions on said guide bar, and a spring engaging said slider to oppose the outward movement thereof.

2. A device for registering the travel of the piston of an air brake comprising a stationary guide bar of substantial length, a slider movably supported thereby arranged to be engaged by the piston and moved outwardly along said guide bar, manually-operable means arranged releasingly to hold said slider in moved positions on said guide bar, and a spring encircling said guide bar and engaging said slider to oppose the outward movement thereof.

3. A device to register the travel of the piston of an air brake, comprising the combination of a stationary guide bar having teeth, a slider movably supported on said bar arranged to be engaged by the piston and moved along said guide bar, and a spring-pressed latch carried by said slider arranged releasingly to engage the teeth of said guide bar to prevent accidental return movement of said slider.

4. A device to register the travel of the piston of an air brake, comprising the combination of a stationary guide bar having teeth, a slider movably supported on said bar arranged to be engaged by the piston and moved along said guide bar, a spring-pressed latch carried by said slider arranged releasingly to engage the teeth of said guide bar to prevent return movement of said slider, and a spring arranged yieldingly to engage said slider to oppose its outward movement.

5. The combination with an air brake cylinder and its piston rod, of a guide bar having teeth on one face thereof arranged above and along the path of travel of said piston rod, means securing the inner end of said guide bar to the air brake cylinder, stationary means arranged to support the outer end of said guide bar, a slider movably supported on said guide bar arranged to be engaged by said piston rod and moved outwardly along said guide bar, and a spring-pressed latch carried by said slider arranged releasingly to engage the teeth of said guide bar and prevent accidental return movement of said slider.

6. The combination with an air brake cylinder and its piston rod, of a guide bar having teeth on one face thereof arranged above and along the path of travel of said piston rod, means securing the inner end of said guide bar to the air brake cylinder, stationary means arranged to support the outer end of said guide bar, a slide movably supported on said guide bar arranged to be engaged by said piston rod and moved outwardly along said guide bar, a manually operable spring-pressed latch carried by said slider arranged releasingly to engage the teeth of said guide bar, and a compression spring encircling said guide bar and engaging said slider and stationary guide-bar supporting-means.

7. A device for registering the travel of the piston of an air brake comprising a guide bar having teeth arranged to be stationarily supported adjacent and parallel to the path of travel of said piston, a slider movably mounted on said guide bar arranged to be engaged by the end of said piston and moved along said guide bar, and means including a manually releasable spring-pressed latch carried by said slider arranged to engage the teeth of said guide bar to restrain said slider in moved positions on said guide-bar against accidental displacement thereon.

8. A device for registering the travel of the piston of an air brake comprising a guide bar arranged to be stationarily supported adjacent and parallel to the path of travel of the piston, a slider movably mounted on said guide bar arranged to be engaged by the end of the piston and moved outwardly along the guide bar, said bar having teeth on its upper face, a manually-releasable spring-pressed latch carried by said slider arranged to engage the teeth of said bar releasingly, said teeth and latch arranged to cooperate to prevent inward movement of said slider until the latch is manually released, and a spring encircling said bar and engaging said bar and slider arranged yieldingly to oppose movement of said slider.

In testimony whereof, I have signed my name to this specification.

WILLIAM HENRY SOUTHER.